No. 878,707. PATENTED FEB. 11, 1908.
R. BEAUMONT & T. HOLLIS.
LOOM FOR PRODUCING TEXTILE FABRICS.
APPLICATION FILED JAN. 29, 1906.
3 SHEETS—SHEET 1.
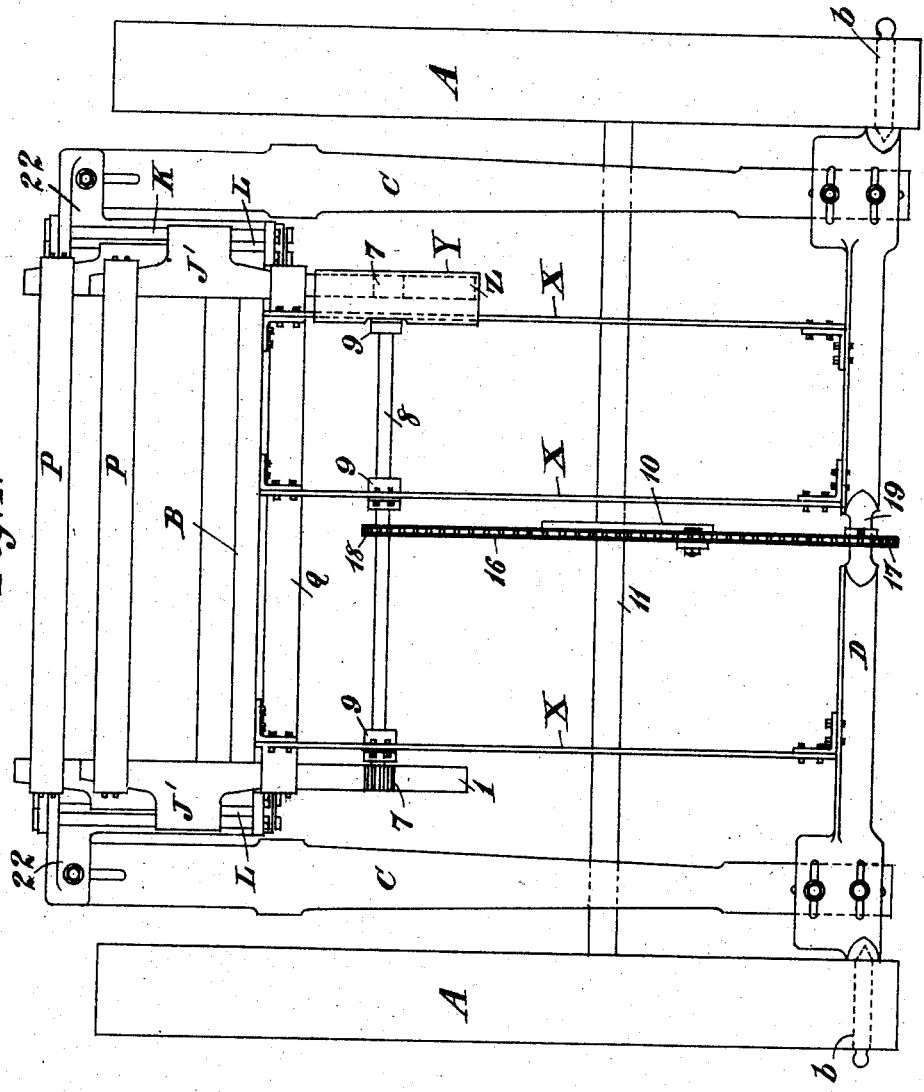

No. 878,707. PATENTED FEB. 11, 1908.
R. BEAUMONT & T. HOLLIS.
LOOM FOR PRODUCING TEXTILE FABRICS.
APPLICATION FILED JAN. 29, 1906.
3 SHEETS—SHEET 2.
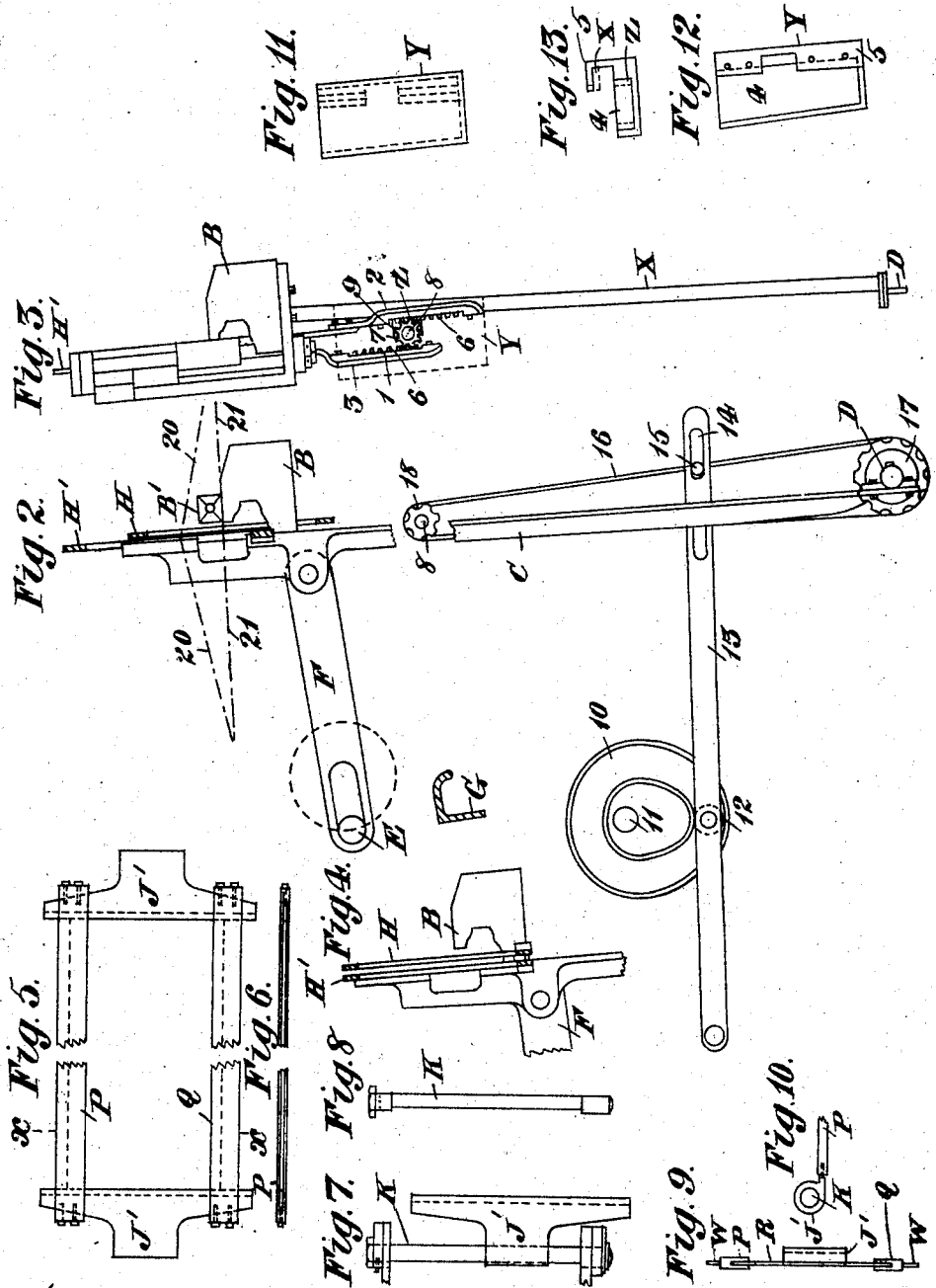
Witnesses:—
William Sadler
Annie Park.
Inventors.
Roberto Beaumont
Thomas Hollis
by H. Fairburn Hart
Attorney

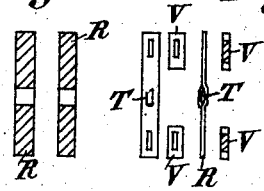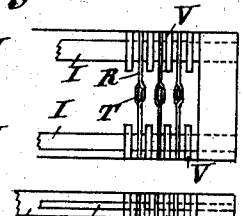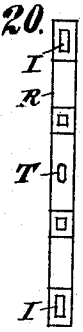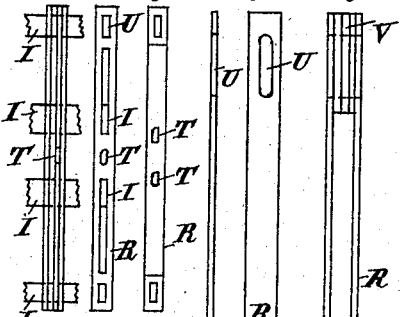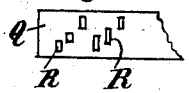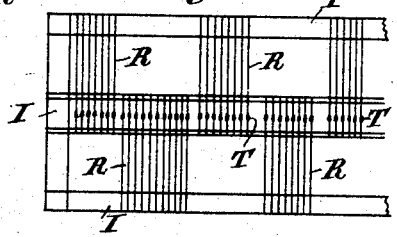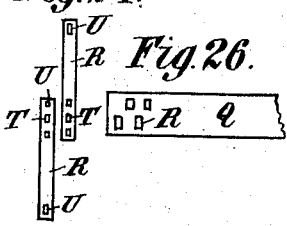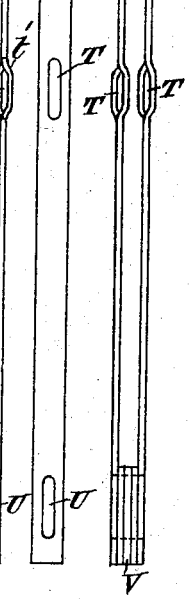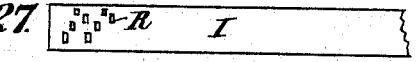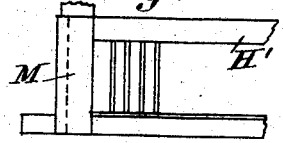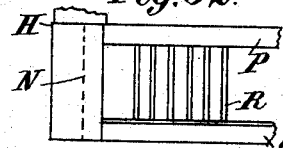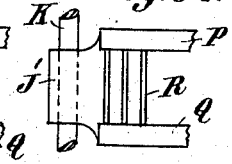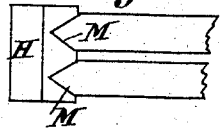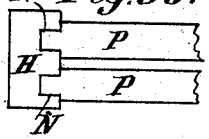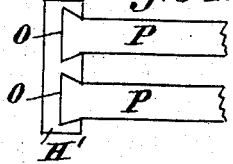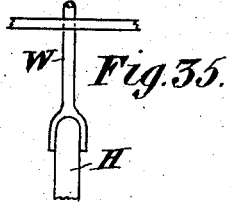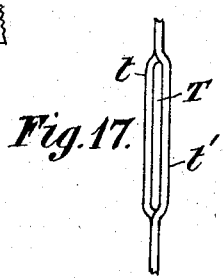

UNITED STATES PATENT OFFICE.

ROBERTS BEAUMONT, OF LEEDS, AND THOMAS HOLLIS, OF SHIPLEY, ENGLAND.

LOOM FOR PRODUCING TEXTILE FABRICS.

No. 878,707.  Specification of Letters Patent.  Patented Feb. 11, 1908.

Application filed January 29, 1906. Serial No. 298,455.

*To all whom it may concern:*

Be it known that we, ROBERTS BEAUMONT, professor of textile industries at the University of Leeds, in the county of York, England, and THOMAS HOLLIS, assistant lecturer at the said university, subjects of the King of Great Britain and Ireland, residing, respectively, at 1 Grosvenor Terrace, Headingley, Leeds, in the county of York, England, and 2 Thompson street, Saltaire Road, Shipley, in the county of York, England, have invented new and useful Improvements in or Relating to Looms for Producing Textile Fabrics, of which the following is a specification.

This invention relates to improvements in looms in which the shedding is for the production of textile fabrics of the ordinary class, that is, in which the warp threads are parallel to each other, and the weft threads are at or about a right angle thereto.

The said improvements are applicable to new or existing machines.

Hitherto in looms for producing textile fabrics, the heald shafts for separating the warp threads to form an opening through which the shuttle may pass, and the slay or reed, hereafter termed "a reed" for beating up the weft yarn have been placed at some distance from each other and actuated or used independently. Also in cross and guaze weaving, split reeds and reeds with eyes have been employed for crossing the warp threads, as well as in plain weaving a single reed has been used in combination with means fixed in a corresponding position to ordinary healds, relative to the "going part" for shedding the warp; further, in hand looms for making certain types of hand tufted or knotted pile carpets in which the warp is arranged vertically, a single reed has been employed to divide the warp threads.

Now the object of the present invention is to dispense with the healds as separately and ordinarily used and to combine them (the healds) in the same or a modified form with the slay and "the going part," or any parts attached thereto, or working in conjunction with "the going part," so that there shall be two or more units mounted upon the lay or "going part" and reciprocating in a direction at right angles to the warp plane for shedding the warp threads. The said two units consist of either a reed and one or more healds, or of two or more reeds constructed as hereafter described by which provision is made for each warp thread to be positively controlled and its position determined. We attain this object by the mechanism illustrated in the accompanying drawings, in which—

Figure 1. is a part front elevation of a loom with the breast beam removed, and with this invention applied to the "going part." Fig. 2. a part sectional elevation of an arrangement showing two reeds at their highest and lowest positions respectively, applied to the "going part" of the loom. Fig. 3. an end elevation of same. Fig. 4. a part end elevation showing the reeds in their center position for beating up the weft yarn. Fig. 5. a front elevation of the reed carrier. Fig. 6. a plan of the reed carrier cap. Fig. 7. a front elevation of the end of a carrier for holding a reed and one of the pillars upon which the carrier slides. Fig. 8. an end elevation of a pillar slide for the reed carrier. Fig. 9. a section of the reed carrier on line $x$, $x$, Fig. 5. Fig. 10. a part plan of the end of the reed carrier and its guide. Fig. 11. a front elevation of one side of the guide brackets for racks attached to the reed carriers. Fig. 12. a back elevation of the same. Fig. 13. a plan of the same. Fig. 14. an enlarged side elevation of the reed strip. Fig. 15. an enlarged front elevation of the same. Fig. 16. an enlarged front elevation of two reed strips with distance pieces between them. Fig. 17. the eye or heald portion of the reed strip drawn to a larger scale. The following are diagrammatic views of the reed. Fig. 18. is a group of diagrammatic views being elevations and a plan of reed strips with eyes in position, and their position in the reed with packings for spacing the reed strips. Fig. 19. a portion of a leaded reed. Fig. 20. one form of front reed to give increased strength for beating up. Fig. 21. another form of reed for the same purpose. Fig. 22. one form of strip for operating two warp threads. Fig. 23. a portion of a front reed showing strips at various heights. Fig. 24. an end elevation showing strips of the same. Figs. 25, 26, and 27. plans of arrangement of the reed strips. Fig. 28. is a front elevation of portion of reed with guides. Fig. 29. a plan of the same. Fig. 30. a front elevation of reed strips, and a portion of a frame for same with pillars to act as guides. Fig. 31. a plan of same. Fig. 32. an elevation of portion of reed strips and a portion of frame for same with tenon guides. Fig. 33. a plan of same. Fig. 34. a plan of a portion of a reed frame with dovetail guides. Fig. 35. a part end elevation showing the cap of the reed frames.

Like parts in all the views are marked with similar letters of reference.

In the drawings several arrangements of reeds are shown adapted for shedding purposes in carrying this invention into practice, but we would distinctly have it understood that no claim is made in this specification separately for such specific construction of reeds.

A is the framework of the loom; B the shuttle race, the top of which is about level with the lowest position of the warp threads when the shed is formed. $B^1$ (Fig. 2) an outline of the end of a shuttle of the "fly" type, that is, one that is automatically operated by a picking motion of ordinary construction for causing it to travel across the loom on the race B; C the swords or upright arms fixed on the swing or rocking shaft D which is pivoted at $b, b$, to the lower portion of the framework. The "going part" is fixed to the swords C in the usual manner. E (Fig. 2) is the crank or driving shaft; F the crank arm or link by which the crank shaft and the "going part" are connected; G (Fig. 4) the breast beam of the loom.

All the above described parts may be of the usual construction, and operate in the ordinary way.

In the accompanying drawings two reed frames H, $H^1$, are shown, but their number may be increased as occasion requires. The frames are mounted to move freely in or on supports carried by the "going part" on the swords C immediately at the rear of the shuttle race B. The frames H, $H^1$, are mounted in carriers. Each carrier consists of bars, hereafter termed caps P and Q, and end pieces $J^1$ into or to which the frames H or $H^1$ are placed and fixed. The end pieces $J^1$ are arranged to work on the eccentric vertical portions of the guides or pillars K, L, (Figs. 1 and 30) mounted in brackets 22 fixed to the swords C and to the "going part" of the loom. The eccentric portions of said pillars are provided for purpose of adjusting the front of the reeds and their carriers in a line with the shuttle boxes. Or in place of the said pillars the frames of the reed may be shaped to work, say, in V-shaped guides M, (Figs. 28 and 29) or square shaped tenons N, (Figs. 32 and 33), or dovetailed O, (Fig. 34). The said guides have a double function to perform, first, to control the reeds during the shedding of the warp; and second, to maintain the reeds in a firm position during the oscillation of the "going part" and particularly during the beating up of the weft. The said reeds are employed for shedding, and the one nearest the fell of the cloth also for beating up the weft yarn. Each reed is placed or fixed with its frame in U-shaped or grooved caps P, Q, (Fig. 5). The caps are fixed to the end pieces $J^1$. The caps P, Q, may be plain, as at Fig. 5, or provided with projecting rods W, (Fig. 35) adapted to work through rails fixed to the "going part" but not shown in the drawings. In the said caps are mounted the reeds carrying the wires or strips, hereafter termed "the strips R." Each strip R possesses the following features, one or more mail or heald eyes T, and one or more holes U on each side of the heald eyes T, through which bars I are made to pass for holding the strips R in position. The spacing of the strips R is effected by means of distance pieces V. The strips R consist of thin pieces of metal, such as are shown at Figs. 14 and 15, and they may be formed by rolling, or stamping, or punching, or by a combination of such processes, and formed in such a manner that when the strips R are threaded upon the bars I, the eyes through which the warp threads pass are at or about a right angle to the bars I and the reed frame. Or the consecutive strips may be fastened together at the top and bottom in a somewhat similar manner to that employed for what are known as "leaded reeds," (Fig. 19). The eyes used as mail or heald eyes T, are formed in any required position on the strips, and they are of any suitable size and shape. Also the said eyes in use may be either plain, or they may be—but not necessarily so—lined, or blocked, or bushed with metal, or porcelain, or glass, or enamel, or any other substance, in order to make them perfectly smooth for enabling the warp threads to pass through them freely.

A mail or heald eye T is provided for each of the warp threads 20, 21, whereby the movement of each warp thread is positively controlled during the shedding operations by the movement of the reeds H, $H^1$.

In the drawings each strip is shown to consist of a thin piece of metal with one or more holes T of a convenient size and shape formed therein as shown at Figs. 14 and 22. The longitudinal sides or walls $t, t^1$, (Figs. 15 and 17) of the holes T are also pressed outwards in an opposite direction in order to form the eye when the strips are placed edgeway as shown at Figs. 15, 16, and 17. When the strip is in position in the reed, as at Fig. 16, the eye so formed is of greater length than width.

The relative distance apart of bars I varies for different depths of sheds, consequently the reed strips will require to be varied in length or depth to correspond.

When more than one reed is used, the whole, or any portion of the strips in one of the reeds may vary in length or depth from those in the other reeds, or the strips in each reed may be of the same or varying lengths or depths, or mounted as shown at Fig. 23.

In this figure it will be seen on reference to the end view that there are two sets of strips R, one set with the eyes T near the bottom, and the other set with the eyes T¹ near the top. This permits of all the heald eyes when placed in position being in a line at or about the center of the reed as shown. The strips R are arranged in groups with a space between each group as shown. In some cases the space is above the two center bars I and in other cases below the said bars. The strips forming each reed and the eyes in the strips are arranged either in a line with each other, as at Fig. 18, or they are arranged in groups as at Fig. 23, or in series behind each other as at Figs. 25 and 26, and as may be required. More than one eye T may be formed in each strip, as at Fig. 22, or the strips in a series may consist of wires with eyes and without eyes arranged in any order as may be required.

The reed frames H, H¹, rise or fall to form an opening for the shuttle, and the shed is closed by bringing them into a suitable position after each pick for the purpose of beating-up the weft, by mechanism, such as for example, by tappets, and levers, or racks, and gearing, or any of the methods usually employed for shedding. In the drawings the said motion is obtained by means of racks and spur pinions arranged to be actuated as follows:—The rocking shaft D (Fig. 3) may, in cross section, be of T-shaped girder, or any other convenient form. On its upper surface is mounted and fixed a number,—say, three, more or less,—of bearers X connected at their opposite ends to the shuttle race B. On the two outer bearers are fixed the guide brackets Y (Figs. 11 to 13) for the racks Z and 1 which are fixed to and hang pendently from the end piece J¹ of the reed carrier. The back portions 2 and 3 of the said racks are bent as shown at Fig. 3, and made to work in the recess 4 (Fig. 13) of the bracket Y. The recessed portion of the bracket is made to project from the edge of the bearer, and the bracket is provided with an L-shaped extension projecting piece 5 by which it is fixed to the bearer. The inner faces of the racks Z and 1 have spur teeth 6 formed thereon adapted to engage with the spur pinion 7 mounted upon a shaft 8 carried in bearings 9 fixed to the bearers X. A bracket Y, two racks Z and 1, and a spur wheel 7 are provided at each end of the shaft 8 and of the reed frame. At Fig. 1, one of the brackets Y is removed. Motion is imparted to the shaft 8 for partially rotating it from a cam 10 mounted upon the shaft 11 through a runner 12 (Fig. 2) mounted upon a lever 13 fulcrumed to a bracket (not shown in the drawings) fixed to the framework at a suitable distance to the rear of the cam. The front end of the lever 13 is slotted at 14 and made to engage with a pin 15 fixed to an endless chain 16 arranged to be intermittently reciprocated respectively around the upper and lower peripheries of the sprocket wheels 17 and 18, one of which is mounted loosely upon the reduced portion 19 (Fig. 1) of the rocking shaft D, and the other sprocket wheel is fixed firmly upon the shaft 8. If desired, the shaft 8 may be made to wholly rotate. As the shaft 8 rotates, one of the reed frames will be raised while the other will be lowered. By imparting motion as described to the reed frames H, H¹, and their carriers, they may be raised and lowered during the oscillation of the "going part."

The herein described reeds and reed carriers may be treated as ordinary healds so far as the production of the woven pattern is concerned, and their number and fineness may be consequently varied.

In some cases it may be found advisable to use healds similar in construction to those ordinarily used, with the reed herein described, or of the usual type, but all operated upon and carried by the "going part."

The action of the herein described mechanism is as follows:—The shuttle having been placed, say, at one end of the race B, an oscillating motion is imparted to the "going part" fixed to the swords C by the crank shaft E through the crank arms or links F. As the "going part" is thus drawn into a backward position, the cam 10, levers 13, pin 15, chain 16, sprocket wheels 17, 18, spur pinions 7, and racks Z, 1, will have been moved into position as shown at Fig. 2. When the "going part" is in this position one of the reeds will have been raised and the other reed lowered to form a passage for the shuttle between the warp threads 20, 21. The cam 10 rotates with shaft 11, and when the forward movement of the "going part" takes place, a change is effected in the position of the lever 13 and pin 15 for bringing the reeds into the level position, shown at Fig. 4. The shed being closed, the beating up of the weft yarn can take place and be accomplished by the front reed.

What we claim as our invention, and desire to secure by Letters Patent, is:—

1. In the looms of the character described, the combination of the framework, a rocking shaft pivoted thereto, swords fixed to said rocking shaft, shuttle race fixed to said swords, bearers having one end fixed to the rocking shaft and the other end to the shuttle race, brackets fixed to the swords and "going part," each bracket having mounted therein two vertical eccentric guide pillars, reed carriers mounted to slide freely upon the said guide pillars during the oscillation of the swords, and means for causing the reed carriers to rise and fall, substantially as described.

2. In looms of the character described, the combination of a rocking shaft pivoted to the framework, two swords carrying the shuttle race, a number of bearers fixed thereto at suitable distances apart, means for oscillating the said swords, brackets fixed to said swords and having vertical guides, reed frames provided with ends adapted to fit and slide upon the said guides, and means for intermittently operating the reed frames during the oscillation of the swords, substantially as described.

3. In looms of the character described, the combination of a rocking shaft pivoted to the framework, two swords carrying the shuttle race a number of bearers fixed to the shuttle race at suitable distances apart, means for oscillating the said swords, brackets fixed to said swords and having vertical guides, reed carriers provided with ends adapted to fit and slide upon the said guides, means for intermittently operating the reed frames during the oscillating of the swords, a number of reed strips, mounted at distances apart upon bars, and having eyes formed therein for the passage of the warp threads, whereby the warp threads are separated as the said reed frames rise and fall for forming a passage for the shuttle, and for beating upon the weft yarn, substantially as described.

4. The combination in a loom of the character described, of the oscillating swords having brackets fixed thereto, and having vertical guides, a reed carrier composed of two end pieces provided with vertical grooves, two grooved horizontal caps fixed to said end pieces at distances apart, reeds adapted to fit the vertical grooves of the end pieces, reeds adapted to fit the horizontal grooves of the caps, having heald eyes formed in the reed strips, substantially as described.

5. The combination of the loom swords, means for oscillating them, a shuttle race fixed to said swords, on the top of which a number of the warp threads rest when the shed is formed, a shuttle supported by said race during its passage across the loom, a number of reeds as described mounted vertically side by side and adapted to slide on guides fixed upon said swords, the reed having a number of perforations for the passage of the warp threads through them, and means for automatically raising and lowering the reeds, whereby each warp thread is positively controlled and its position determined by the movement of the reeds, substantially as described.

6. In looms of the character described, the combination of a rocking shaft pivoted to the framework of the loom, swords fixed to said shaft, means for oscillating the same, a shuttle race fixed to said swords and "going part," brackets fixed to said "going part," pillars mounted in said brackets, reed carriers mounted to slide upon the pillars, spur racks fixed pendently to the ends of each reed carrier, spur pinions meshing with said racks for intermittently lifting and depressing the reed carriers, a shaft upon which the spur pinions are fixed, sprocket wheels mounted respectively upon the said shaft and the rocking shaft, an endless chain passing partially around said sprocket wheels and means for imparting an intermittent motion to said chain from a shaft of the loom, substantially as described.

7. In looms of the character described, the combination of a rocking shaft pivoted to the framework of the loom, swords fixed to said shaft, means for oscillating the same, a shuttle race fixed to said swords and "going part," brackets fixed to said "going part," pillars mounted upon said brackets, reed carriers mounted upon the pillars, and provided with grooved end pieces and caps adapted to be fixed to said end pieces, reed strips arranged vertically in groups in a frame, with heald eyes formed therein as described, spur racks fixed pendently to the ends of said reed carrier, pinions meshing with said racks, means for intermittently lifting and depressing the reed carriers, a shaft upon which the spur pinions are fixed, sprocket wheels mounted respectively upon the said shaft and the rocking shaft, an endless chain passing partially around said sprocket wheels, and means for imparting an intermittent motion to said chain from a shaft of the loom, substantially as described.

In testimony whereof we have signed our names to this specification in the presence of two subscribing witnesses.

ROBERTS BEAUMONT.
THOMAS HOLLIS.

Witnesses:
  FRITZ. KRAMER,
  ANNIE PARK.